United States Patent [19]

Ellis

[11] 4,364,636

[45] Dec. 21, 1982

[54] HELMET MOUNTED SIGHT WITH FIXED DISPLAY AND PIVOTAL ARM

[75] Inventor: Stafford M. Ellis, Sussex, England

[73] Assignee: Elliott Brothers (London) Limited, Chelmsford, England

[21] Appl. No.: 202,710

[22] Filed: Oct. 31, 1980

[30] Foreign Application Priority Data

Nov. 9, 1979 [GB] United Kingdom ............... 7938918

[51] Int. Cl.³ ............................................. G02B 27/10
[52] U.S. Cl. ...................................... 350/174; 350/298
[58] Field of Search ............................... 350/174, 298

[56] References Cited

U.S. PATENT DOCUMENTS

| Re. 28,847 | 6/1976 | Vizenor | 350/174 |
| 3,170,979 | 2/1965 | Baldwin et al. | 350/174 |
| 4,081,209 | 3/1978 | Heller et al. | 350/174 |

OTHER PUBLICATIONS

Yoder, Paul, *SPIE Jour.*, vol. 9, No. 1, Oct.-Nov. 1970, pp. 5-9.

*Primary Examiner*—Jon W. Henry
*Attorney, Agent, or Firm*—Kirschstein, Kirschstein, Ottinger & Cobrin

[57] ABSTRACT

According to the present invention a sight unit, for an headgear comprises a mount member adapted to be secured to the headgear, an arm member pivotally connected to the mount member, a collimating sight carried by the arm member, and, a substantially flat display surface a virtual image at infinity of which is to be formed by the collimating sight and in which the arm is pivotal between an operative position at which when the headgear is being worn the sight intercepts the wearer's forward line of sight to the distant scene and a stowed position at which the sight does not intrude into the wearer's field of view to the forward distant scene, and no part of the arm or the sight has a transverse dimension greater than a prescribed human interpupillary distance, wherein the said display surface is secured to the mount member and when the arm is at the operative position the sight defines an optical axis which intercepts the display surface perpendicular thereto.

3 Claims, 4 Drawing Figures

HELMET MOUNTED SIGHT WITH FIXED DISPLAY AND PIVOTAL ARM

This invention relates to helmet mounted sights.

U.S. Pat. No. 3,170,979 discloses an helmet mounted sight in which the display device, in particular a cathode ray tube, is within a tubular arm. The arm has a free end at which is carried a combiner. Within the tubular arm, between the screen of the cathode ray tube and the sight, is a collimating optic arrangement. The observer, wearing the helmet, is able to view the distant scene through the combiner; and collimated light projected by the optic arrangement from the c.r.t. is reflected at the combiner to the observer's eye with the result that the observer observes the projected data as a virtual image "at infinity".

In the prior specification the arm is pivotal about an axis, fixed with respect to the helmet, between an operative position, at which the combiner is before an eye of the pilot, and a stowed or retracted position, at which the combiner and the arm are above the observer's normal forward field of view so as not to constitute an unacceptable intrusion. To avoid the possibility that the presence of an opaque object, the arm, does not obscure any part of the distant scene it, the arm, is made with a transverse dimension less than the observer's interpupillary distance. By this means any information loss at one eye is compensated by information received at the other.

The Society of Photo-Optical Instrumentation Engineers Journal Volume 9 No. 1 for October-November 1970 has, at pages 5 to 9, an article entitled "BeamCombining Eyepiece Configuration" by Paul R. Yoder Jr. The article describes an helmet mounted sight. A cathode ray tube is housed within a tubular housing; a free end of the housing carries a combiner; and within the tubular arm between the c.r.t. and the combiner there is a collimating optic arrangement. The housing is slidably adjustable with respect to a mounting plate secured to the helmet. The adjustment is for the purpose of accommodating the sight to suit the varying physical dimensions of potential wearers of the helmet. Direct viewing through and around the combiner is stated to be essentially unobscured.

Neither of the prior art arrangements referred to above is capable of being used with a visored helmet which is essential for military aircraft pilots. It is not feasible, using the proposals of the references, to arrive at a satisfactory design of sight which can be packaged within the limited space between the visor and the helmet.

According to the present invention a sight unit, for an headgear comprises a mount member adapted to be secured to the headgear, an arm member pivotally connected to the mount member, a collimating sight carried by the arm member, and a substantially flat display surface a virtual image at infinity of which is to be formed by the collimating sight and in which the arm is pivotal between an operative position at which when the headgear is being worn the sight intercepts the wearer's forward line of sight to the distant scene and a stowed position at which the sight does not intrude into the wearer's field of view to the forward distant scene, and no part of the arm or the sight has a transverse dimension greater than a prescribed human interpupillary distance, wherein the said display surface is secured to the mount member and when the arm is at the operative position the sight defines an optical axis which intercepts the display surface perpendicular thereto.

A preferred embodiment of the invention is hereinafter described with reference to the accompanying drawings in which FIG. 1 is a front elevation of an helmet;

Figure 1:
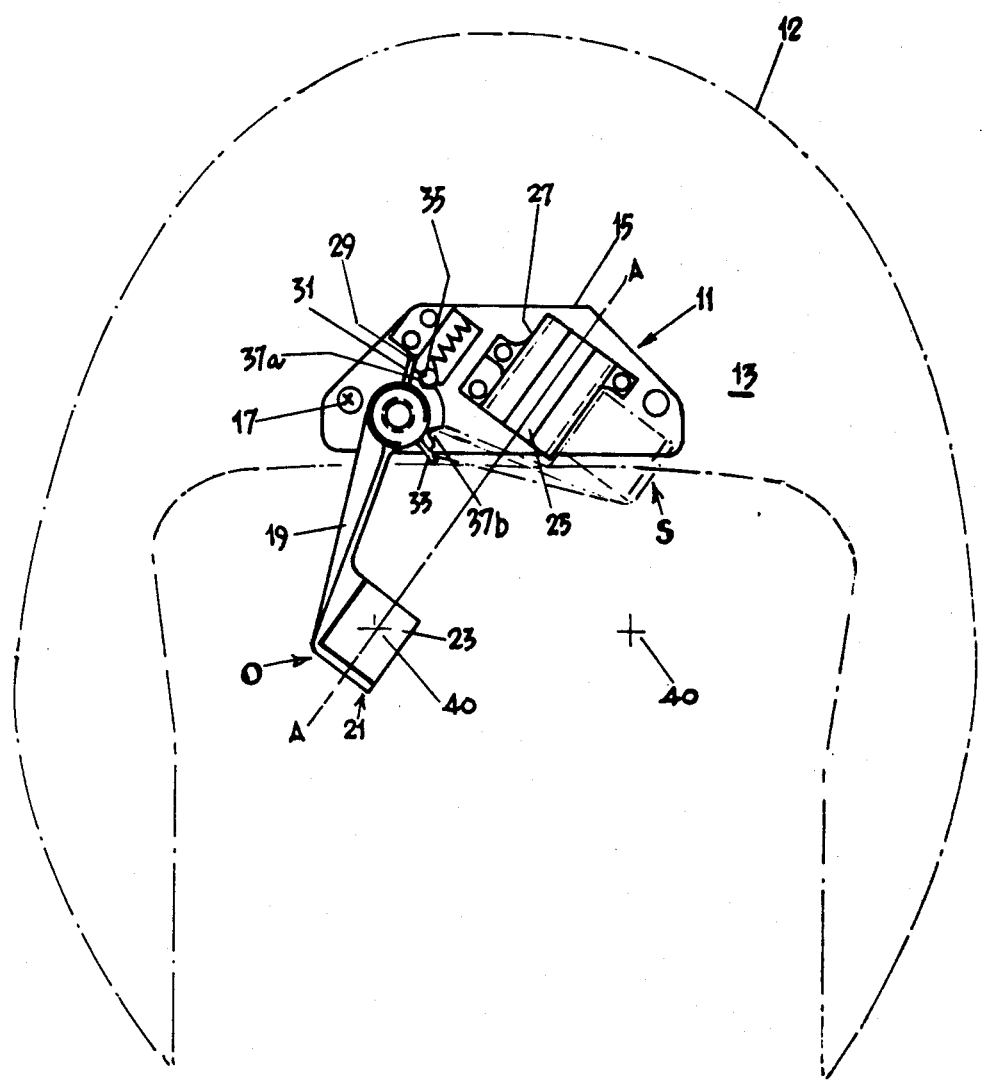
Figure 2:
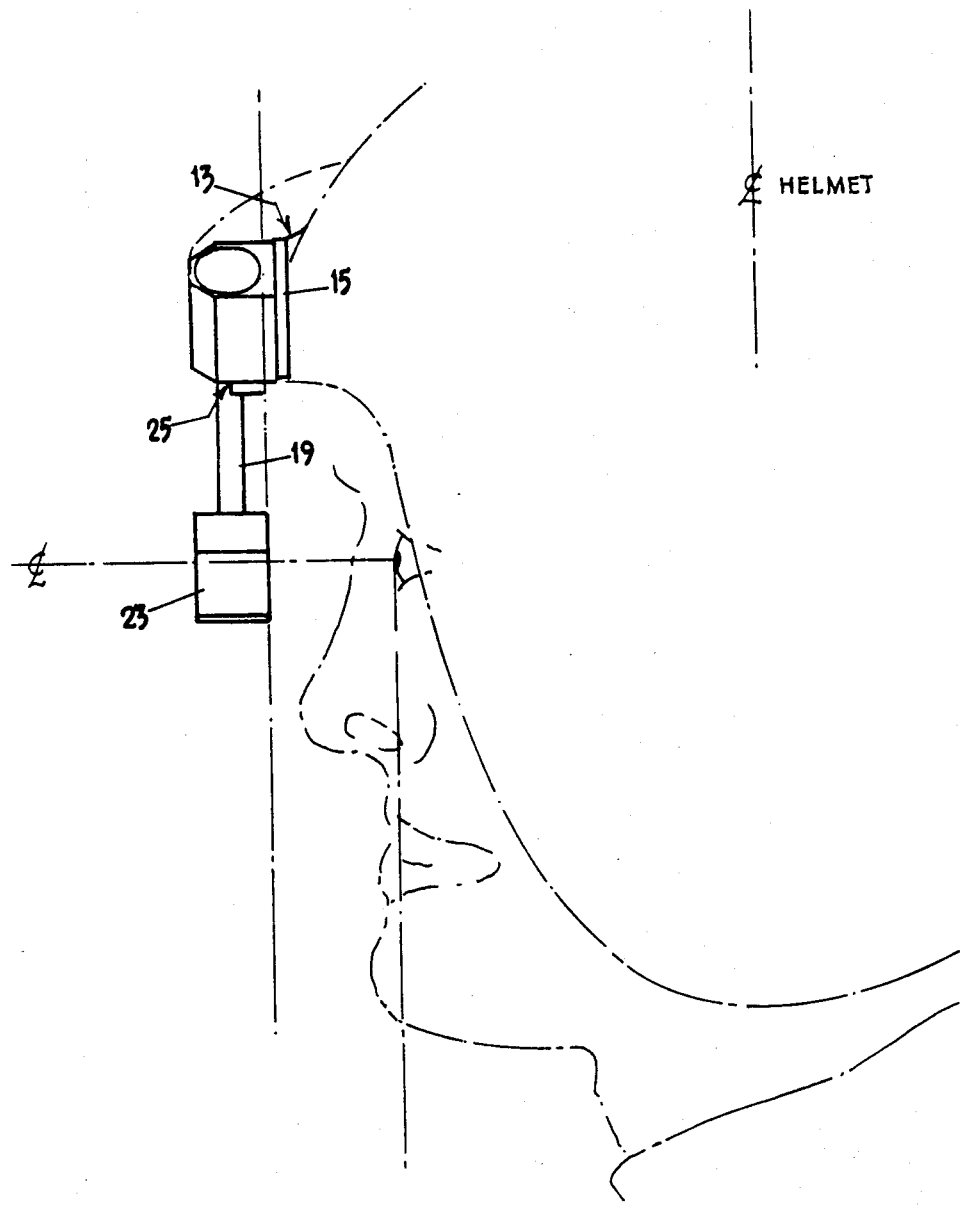
FIG. 2 is a side elevation of the helmet.
Figure 3:
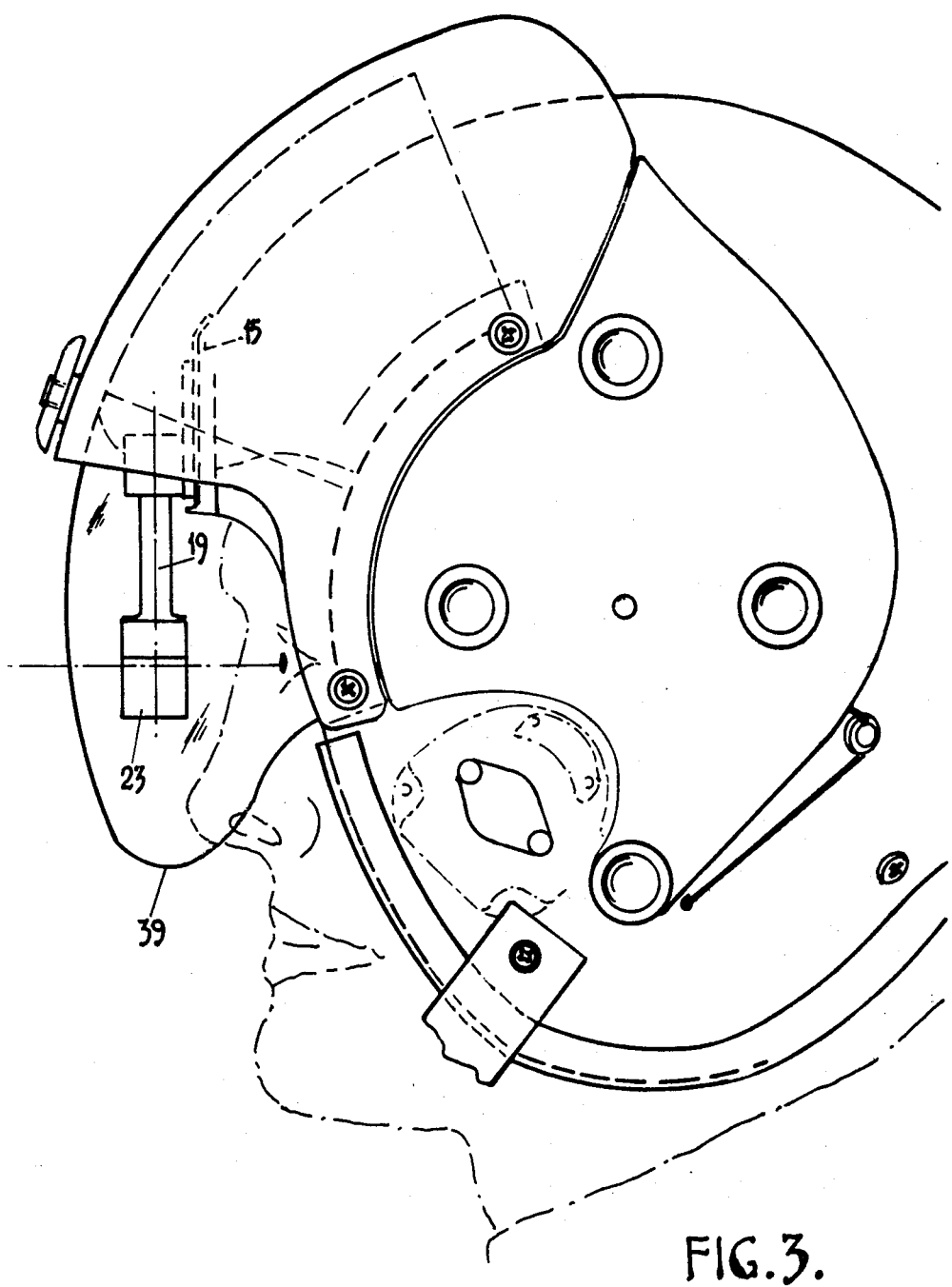
FIG. 3 is a side elevation of the helmet showing a visor in the lowered position; and, FIG. 4 is a front elevation of the helmet of FIG. 3.

All of the figures are to the scale represented on FIG. 1. The sight unit 11 is supported with respect to the helmet 12 from a frontal marginal surface portion 13 of the helmet.

The unit 11 has a mounting plate 15 secured to the surface portion 13 by screw fasteners 17. An arm member 19 is pivotally connected to the plate 15. The arm member 19 carries, at its free end 21, a Michelin sight 23. A flat display surface of the unit 11 comprises a two dimensional array of light emissive diodes (LED's). The array 25 is supported at its periphery within a tubular housing 27 fixed with respect to the plate 15. The housing 27 has a longitudinal axis A—A which is perpendicular to the plane of the display surface and which is inclined with respect to the vertical. The mounting position is such that the longitudinal axis A—A passes through the fore and aft median plane adjacent the frontal edge of the helmet.

The arm 19 is pivotal between a stowed or retracted position S at which the sight 23 is laterally disposed with respect to the housing 27, as shown in chain dotted lines in FIG. 1, and an operating position 0 at which the optical axis of the Michelin sight is coincident with the axis A—A of the housing 27.

The latter position is defined by contact between a stop 29 and an abutment 31 on the arm 19. The stowed position is defined by the stop 39 and a second abutment 33 of the arm 19. The stop 29 has a spring loaded ball 35 engageable with indentations, 37a, 37b, to form detents defining the operative and stowed positions.

Figure 4:
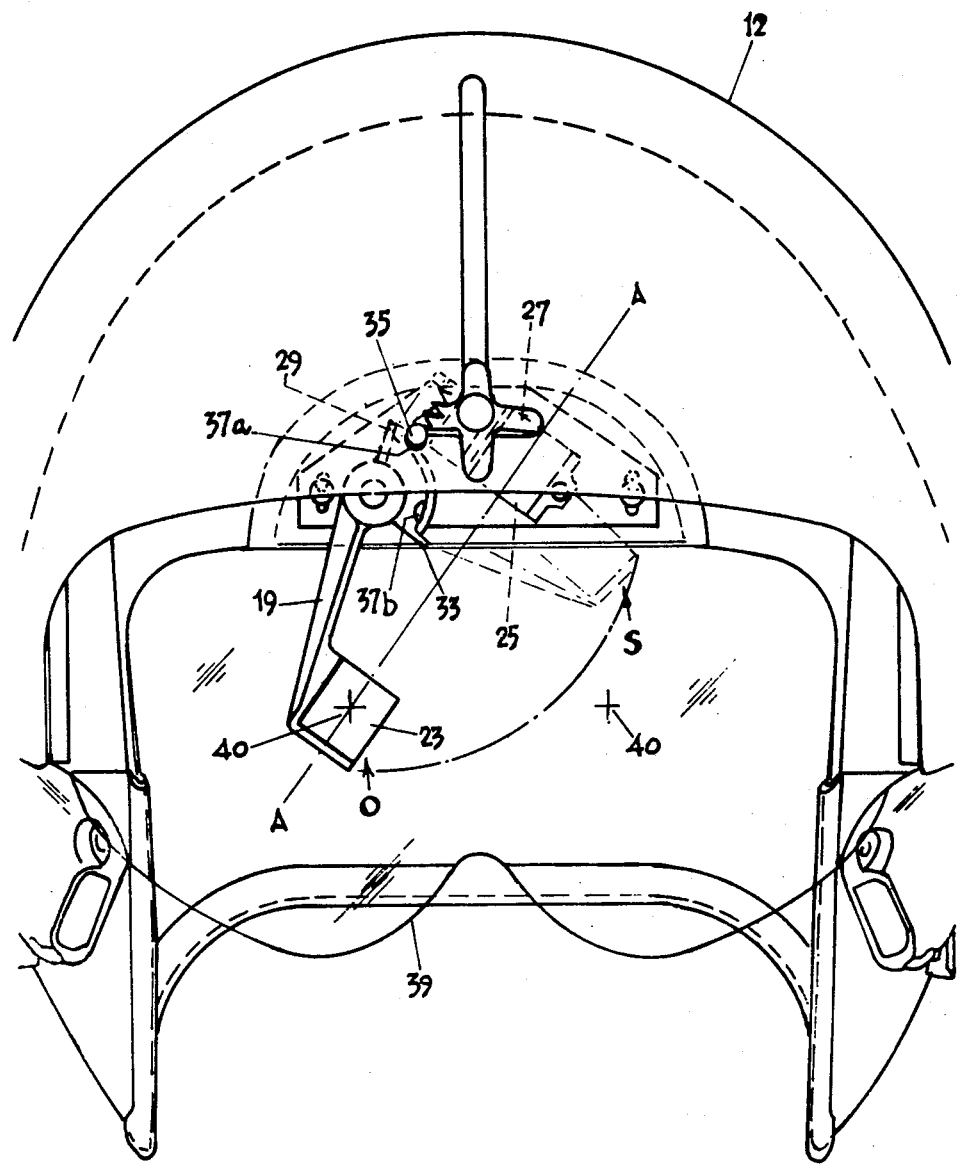

As may be seen, (FIG. 4) the sight is accommodated within the space between the visor 39 and the wearer. And although the display is in the form of an array of LED's it is possible to utilize a c.r.t. and yet remain within the space limitation imposed by the presence of the visor 39.

I claim:

1. A sight for an headgear comprising a mount member adapted to be secured to the headgear, an arm member pivotally connected to the mount member, a collimating sight carried by the arm member, and a substantially flat display surface a virtual image at infinity of which is to be formed by the collimating sight and in which the arm is pivotal between an operative position at which when the headgear is being worn the sight intercepts the wearer's forward line of sight to the distant scene and a stowed position at which the sight does not intrude into the wearer's field of view to the forward distant scene, and no part of the arm or the sight has a transverse dimension greater than a prescribed human interpupillary distance, wherein the said display surface is fixedly secured to the mount member said that only when the arm is at the operative position the sight defines an optical axis which intercepts the display surface perpendicular thereto.

2. A sight for an headgear according to claim 1 wherein said collimating sight comprises a Michelin sight.

3. A sight for an headgear according to claims 1 or 2 wherein said flat display surface has a longitudinal axis perpendicular to said surface, said longitudinal axis passing through the front to back median plane of the helmet adjacent the frontal edge of said helmet.

* * * * *